(12) United States Patent
Sahay

(10) Patent No.: US 12,722,118 B2
(45) Date of Patent: Sep. 1, 2026

(54) SYSTEM AND METHOD FOR CAPTURING CARBON DIOXIDE FROM A HUMIDITY ADJUSTED AIR STREAM

(71) Applicant: Anahat Sahay, Katy, TX (US)

(72) Inventor: Anahat Sahay, Katy, TX (US)

( * ) Notice: Subject to any disclaimer, the term of this patent is extended or adjusted under 35 U.S.C. 154(b) by 383 days.

(21) Appl. No.: 18/387,808

(22) Filed: Nov. 7, 2023

(65) Prior Publication Data

US 2025/0144563 A1 May 8, 2025

(51) Int. Cl.

| | |
|---|---|
| ***B01D 53/62*** | (2006.01) |
| ***B01D 15/20*** | (2006.01) |
| ***B01D 15/36*** | (2006.01) |
| ***B01D 53/82*** | (2006.01) |
| ***B01D 53/96*** | (2006.01) |
| ***B01D 61/46*** | (2006.01) |
| *C02F 1/42* | (2023.01) |

(52) U.S. Cl.

CPC ........... *B01D 53/62* (2013.01); *B01D 15/203* (2013.01); *B01D 15/362* (2013.01); *B01D 53/82* (2013.01); *B01D 53/965* (2013.01); *B01D 61/46* (2013.01); *B01D 2253/202* (2013.01); *B01D 2253/206* (2013.01); *B01D 2257/504* (2013.01); *B01D 2258/06* (2013.01); *B01D 2259/40083* (2013.01); *B01D 2259/40092* (2013.01); *C02F 1/42* (2013.01); *C02F 2001/425* (2013.01); *C02F 2303/16* (2013.01)

(58) Field of Classification Search

CPC .... B01D 53/62; B01D 15/203; B01D 15/362; B01D 53/82; B01D 53/965; B01D 61/46; B01D 2253/202; B01D 2253/206; B01D 2257/504; B01D 2258/06; B01D 2259/40083; B01D 2259/40092; B01D 61/445; B01D 2311/2626; C02F 1/42; C02F 2001/425; C02F 2303/16; Y02C 20/40

See application file for complete search history.

(56) References Cited

U.S. PATENT DOCUMENTS

| | | | |
|---|---|---|---|
| 6,364,938 B1 * | 4/2002 | Birbara | A62B 11/00 95/139 |
| 10,065,174 B1 * | 9/2018 | Wifong | B01J 20/3028 |
| 10,603,654 B1 * | 3/2020 | Wilfong | B01J 20/2803 |
| 2007/0221552 A1 * | 9/2007 | Denney | B01D 21/30 210/85 |

(Continued)

*Primary Examiner* — Dung H Bui

(57) ABSTRACT

The present invention relates to a system for capturing carbon dioxide from an air stream. The system includes a carbon dioxide capturing unit that includes a humidity/temperature adjusting unit with an evaporative cooling unit and a $CO_2$ adsorbing unit. The $CO_2$ adsorbing unit includes a sorbent column made of polyamine-Cu (II) complex resin. The humidity/temperature adjusting unit receives air stream from ambient atmosphere and process the air stream to obtain a humidity-adjusted air stream. The $CO_2$ adsorbing unit receives the humidity-adjusted air stream to pass through the sorbent column. The sorbent column selectively adsorbs the $CO_2$ from the humidity-adjusted air stream. The sorbent column is regenerated using an alkaline stream to separate the adsorbed $CO_2$ from the sorbent column.

14 Claims, 4 Drawing Sheets

(56) References Cited

U.S. PATENT DOCUMENTS

| | | | | |
|---|---|---|---|---|
| 2008/0087165 | A1* | 4/2008 | Wright | C12M 29/00 96/111 |
| 2008/0190567 | A1* | 8/2008 | Winsness | B01D 21/262 159/5 |
| 2010/0105126 | A1* | 4/2010 | Wright | B01D 53/22 204/542 |
| 2011/0081709 | A1* | 4/2011 | Wright | B01D 53/1493 435/257.1 |
| 2013/0343981 | A1* | 12/2013 | Wright | A01M 1/023 423/437.1 |
| 2017/0107478 | A1* | 4/2017 | Harmon | F23J 15/02 |
| 2019/0233296 | A1* | 8/2019 | Novek | B01D 61/029 |
| 2022/0331740 | A1* | 10/2022 | Simonetti | B01D 15/363 |
| 2023/0036635 | A1* | 2/2023 | Santos-Heard | B01J 20/20 |
| 2023/0126394 | A1* | 4/2023 | Bush | C25B 9/65 205/555 |
| 2024/0017202 | A1* | 1/2024 | Cirucci | B01D 53/0454 |
| 2024/0408578 | A1* | 12/2024 | Balaji | B01D 53/96 |
| 2025/0144563 | A1* | 5/2025 | Sahay | B01D 15/203 |
| 2025/0223710 | A1* | 7/2025 | Singh | C25B 11/075 |

* cited by examiner

SYSTEM AND METHOD FOR CAPTURING CARBON DIOXIDE FROM A HUMIDITY ADJUSTED AIR STREAM

CLAIM FOR PRIORITY

None.

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

This invention generally relates to the field of carbon di-oxide ($CO_2$) capture, more specifically, to a carbon dioxide capturing system for capturing carbon dioxide from a humidity and temperature adjusted air stream.

BACKGROUND OF THE INVENTION

Now-a-days Carbon dioxide ($CO_2$) capture and utilization (CCU) approach is gaining attention due to its potential to reduce emissions while also creating economic value by turning a greenhouse gas into a resource. CCU involves capturing $CO_2$ emissions from industrial processes, power plants, and even directly from the atmosphere using technologies like carbon capture and storage (CCS) or direct air capture (DAC). Once captured, the $CO_2$ can be utilized for various applications including (i) enhanced oil recovery (EOR), (ii) forming building materials like cement, concrete by carbonate precipitation; (iii) as chemical feedstock for the production of chemicals and materials; (iv) for the production of synthetic fuels like diesel or jet fuel; (v) biological utilization as a feedstock for growth of certain microorganisms.

Direct air capture (DAC) presents a unique approach by directly targeting atmospheric $CO_2$, allowing for the potential removal and utilization of the greenhouse gas ($CO_2$). For capturing $CO_2$, the conventional DAC methods employ sorbents, solvents, electrodes or membranes that selectively absorb or separate $CO_2$ from other gases. Due to the low concentrations of the $CO_2$ in the ambient atmosphere, adosrbents with high capacity are required to store carbon dioxide from such low concentrations.

In addition, challenges remain in terms of the energy requirements, cost-effectiveness, and scalability of $CO_2$ capture methods. The conventional DAC methods require significant energy inputs (for example, heat energy), especially during a regeneration phase when the captured $CO_2$ is released from the solvent. The energy-intensive nature of DAC contributes to high operating costs and limited scalability. Hence, there is a continued need for efficient and economically viable $CO_2$ capture methods.

Accordingly, there remains a need to address the aforementioned technical drawbacks in existing DAC methods in capturing $CO_2$ effectively from direct air in the atmosphere at low cost.

BRIEF SUMMARY OF THE INVENTION

The first aspect of the present invention provides a system for capturing carbon dioxide from an air stream. The system includes a carbon dioxide capturing unit that includes a humidity/temperature adjusting unit comprising an evaporative cooling unit and a $CO_2$ adsorbing unit. The carbon dioxide adsorbing unit comprises a sorbent column made of polyamine-Cu (II) complex resin. The humidity/temperature adjusting unit is configured to receive the air stream from ambient atmosphere and enhancing the humidity to near saturation by utilizing the air stream for evaporative cooling in the evaporative cooling unit with lowered temperature and then adjusting the humidity of the air stream by drawing additional air and mixing the additional air with the air stream to obtain a target humidity while maximizing the flow of air stream. The high humidity air stream comprises a humidity of about 75 to 98% and the humidity-adjusted air stream comprises a humidity of about 50 to 75%. The lowered temperature can result in an air stream between 10 degree Celsius and 30 degree Celsius with a drop of ambient air temperature by almost 10 degree Celsius. The $CO_2$ adsorbing unit is configured to receive the humidity-adjusted low temperature air stream from the humidity/temperature adjusting unit and allow the humidity-adjusted air stream to pass through the sorbent column to selectively adsorb the $CO_2$ from the humidity-adjusted air stream, thereby capturing the $CO_2$ from the humidity-adjusted air stream. The sorbent column is regenerated to separate the adsorbed $CO_2$ from the sorbent column by (i) passing a source of NaCl to the sorbent column, and displacing the captured $CO_2$ in the resin with chloride (Cl—) ion and releasing the captured $CO_2$ in the NaCl solution as a bicarbonate ion (HCO3-) (ii) passing an alkaline stream to the sorbent column upon passing the source of NaCl, thereby replacing the chloride species (Cl—) in the resin with hydroxide ion (OH—).

In an embodiment, the evaporative cooling unit is a Peltier hybrid cooling system with cooling enhancement provided by Peltier plates. The evaporative cooling unit produces the air stream with the right humidity and lowered temperature which enhances the capture of $CO_2$ gas from the air stream when in operation.

In another embodiment, the polyamine-Cu (II) complex resin is Polyam-N-Cu2+ resin.

In yet another embodiment, the sorbent column is conditioned using at least one of spent alkali with a pH in a range of 11-13 or fresh batch of 0.5% weight by weight (w/w) of NaOH before allowing the humidity-adjusted low temperature air to pass through.

In yet another embodiment, the source of NaCl comprises at least one of sea water, spent brine or fresh brine. The alkaline stream comprises at least one of NaOH solution or lime regenerant.

In yet another embodiment, around 60-bed volumes of the source of NaCl and 20 bed volumes of the alkaline stream are passed through the sorbent column in a down-flow mode.

In yet another embodiment, the sorbent column is regenerated by exposing the sorbent column to hot water at a temperature of 80° C. or any waste heat source.

In yet another embodiment, the evaporative cooling unit is an empty box, a vegetable cooler, a gymnasium which has been air cooled in arid environment or a pigsty cooler for animals in arid and hot environment.

In yet another embodiment, the $CO_2$ adsorbing unit are provided as modular cartridges.

In yet another embodiment, the sorbent column is regenerated using NaOH produced through electro-dialysis of NaCl in a bipolar Electro-dialysis reversal (EDR) unit.

In yet another embodiment, the spent NaCl solution comprising adsorbed $CO_2$ as a bicarbonate ion ($HCO_3$—) is used to regenerating resins of a water softening unit comprising a Strong Acid Cation (SAC) resin unit 204 and a Weak Acid Cation (WAC) resin unit.

The second aspect of the present invention provides a method for capturing carbon dioxide from air stream. The method comprises the steps of: (i) providing a carbon dioxide capturing unit that comprises a humidity/temperature adjusting unit comprising an evaporative cooling unit and a $CO_2$ adsorbing unit. The $CO_2$ adsorbing unit comprises a sorbent column made of polyamine-Cu (II) complex resin; (ii) receiving the air stream from ambient atmosphere by the humidity/temperature adjusting unit. The humidity/temperature adjusting unit is configured to (a) enhance the humidity of the air stream by utilizing the air stream for evaporative cooling in the evaporative cooling unit to obtain a high humidity-low temperature air stream and (b) adjust the humidity of the high humidity-low temperature air stream as appropriate by drawing additional air and mixing the additional air with the high humidity-low temperature air stream; (iii) performing selective adsorption of the carbon dioxide by the $CO_2$ adsorbing unit. The $CO_2$ adsorbing unit comprises a sorbent column that selectively adsorbs the $CO_2$ from the humidity-adjusted air stream that is passed through the sorbent column; and (iv) regenerating the sorbent column to separate the adsorbed $CO_2$ from the sorbent column by (a) passing a source of NaCl to the sorbent column, and displacing the captured $CO_2$ in the resin with chloride (Cl—) ion and releasing the captured $CO_2$ in the NaCl solution as a bicarbonate ion (HCO3-); (b) passing an alkaline stream to the sorbent column upon passing the source of NaCl, thereby replacing the chloride species (Cl—) in the resin with hydroxide ion (OH—).

In an embodiment, the method comprising conditioning the sorbent column using at least one of spent alkali with a pH in a range of 11-13 or fresh batch of 0.5% weight by weight (w/w) of NaOH before allowing the humidity-adjusted air to pass through.

In another embodiment, the method comprising regenerating the sorbent column by (i) passing around 60-bed volumes of the source of NaCl to the sorbent column and displacing the captured $CO_2$ in the resin with chloride (Cl—) ion and releasing the captured $CO_2$ in the NaCl solution as the bicarbonate ion (HCO3-); and (ii) passing around 20 bed volumes of the alkaline stream to the sorbent column in a down-flow mode, upon passing the source of NaCl, thereby replacing the chloride species (Cl—) in the resin with hydroxide ion (OH—).

In yet another embodiment, the method includes regenerating resins of a water softening unit comprising a Strong Acid Cation (SAC) resin unit with primary resins and a Weak Acid Cation (WAC) resin unit with polishing resins. The method includes introducing the NaCl solution comprising $CO_2$ bicarbonate ion (HCO3-) from the $CO_2$ adsorbing unit into a Strong Acid Cation (SAC) resin unit of the water softening unit to regenerate the Strong Acid Cation (SAC) resin unit.

In yet another embodiment, the method includes regenerating the Weak Acid Cation (WAC) resin unit of the water softening unit using NaOH and HCl produced from NaCl by performing electrodialysis in a bipolar Electrodialysis reversal (EDR) unit.

In yet another embodiment, the method includes regenerating the sorbent column of the $CO_2$ adsorbing unit simultaneously using the NaOH produced from the bipolar Electrodialysis reversal (EDR) unit.

The carbon dioxide capturing unit can be integrated with any kind of humidity adjustment system. For example, the carbon dioxide capturing unit can be integrated with Evaporative-Peltier hybrid cooling system. This integrated cooling system (i.e.) Evaporative-Peltier hybrid cooling system and the carbon dioxide capturing unit can be used for any cooling applications. In some exemplary embodiments, the integrated cooling system can be used in a cooling enclosure, for example, pigsty to keep animals such as pigs, cows, or pets cool or to raise livestock. The carbon dioxide capturing unit captures more $CO_2$ effectively as the humidity of the ambient air stream is increased and temperature of the air stream is reduced with humidity adjustment to increase the volume of air processed. The efficiency is further enhanced by conditioning and regenerating the sorbent column of the $CO_2$ adsorbing unit with appropriate conditioners or regenerants at suitable concentrations. The system of the present invention can be deployed as a modular system in versatile environment that may include an open environment comprising a cattle breeding environment, a house hold setting or an industrial environment and functions as a cost-effective and an efficient carbon dioxide capture system. The $CO_2$ adsorbing unit are built as cartridges facilitating transfer to a central facility where the regeneration is performed. Additionally, the bipolar EDR unit can be built in a place for regenerating the $CO_2$ adsorbing unit and the resins where produced water or boiler feed water is routinely softened for making steam in the water softening unit. The regeneration system involving the bipolar EDR unit may be built in the middle of a farming community.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

Like reference numerals refer to like parts throughout the several views of the drawings.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. A system for capturing carbon dioxide from a humidity-adjusted air stream is discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or description below. The present invention will now be described by referencing the appended figures representing preferred embodiments.

Figure 1:
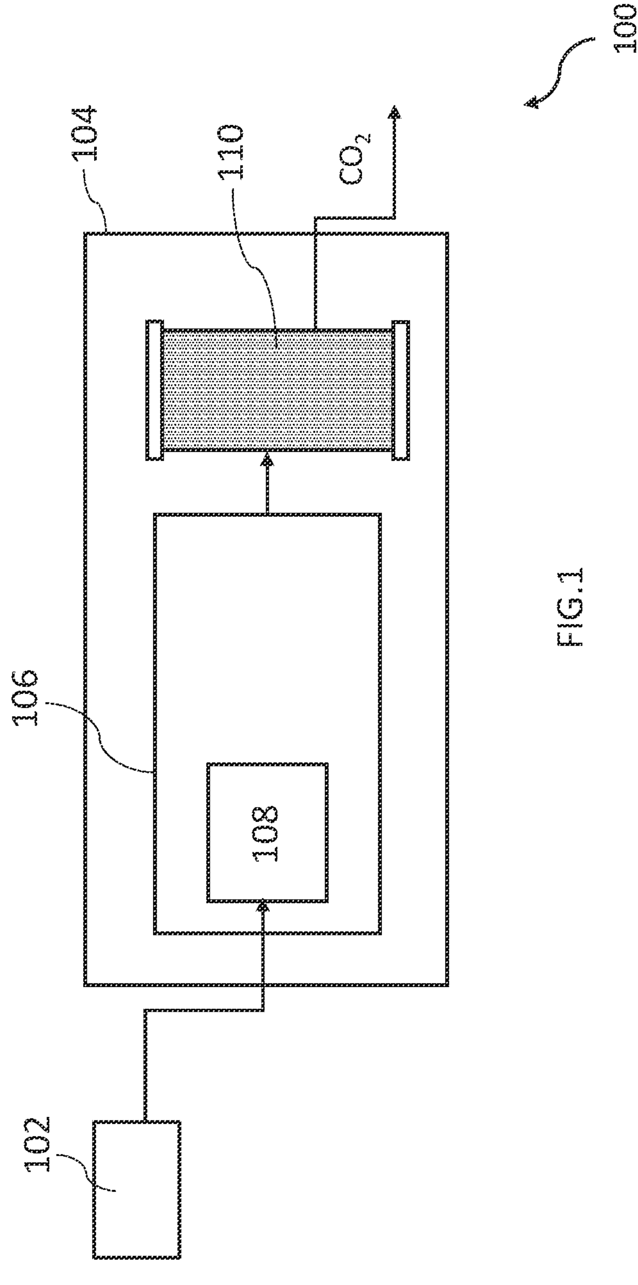
FIG. 1 illustrates a system for capturing carbon dioxide from a humidity-adjusted air stream according to various embodiments of the present invention.

FIG. 1 illustrates a system for capturing carbon dioxide from a humidity-adjusted air stream according to various embodiments of the present invention. The system 100 includes an air source 102, a carbon dioxide capturing unit 104 that includes a humidity/temperature adjusting unit 106 comprising an evaporative cooling unit 108 and a $CO_2$ adsorbing unit 110. The carbon dioxide adsorbing unit 110 comprises a sorbent column made of polyamine-Cu (II) complex resin. The humidity/temperature adjusting unit 106 receives the air stream from the air source 102. The air source may be ambient air from atmosphere or a flue gas. The humidity/temperature adjusting unit 106 is configured to enhance the humidity of the air stream to near saturation by utilizing the air stream for evaporative cooling in the evaporative cooling unit 108 with lowered temperature and then adjusts the humidity of the high humidity-low temperature air stream by drawing additional air and mixing the additional air with the high humidity-low temperature air stream to obtain a target humidity while maximizing the flow of air stream. The $CO_2$ adsorbing unit 110 is configured to receive the humidity-adjusted low temperature air stream from the humidity/temperature adjusting unit 106 and allow the humidity-adjusted air stream to pass through the sorbent column to selectively adsorb the $CO_2$ from the humidity-adjusted air stream, thereby capturing the $CO_2$ from the humidity-adjusted air stream. The sorbent column is regenerated to separate the adsorbed $CO_2$ from the sorbent column by (i) passing a source of NaCl to the sorbent column, and displacing the captured $CO_2$ in the resin with chloride (Cl—) ion and releasing the captured $CO_2$ in the NaCl solution as a bicarbonate ion (HCO3-) (ii) passing an alkaline stream to the sorbent column upon passing the source of NaCl, thereby replacing the chloride species (Cl—) in the resin with hydroxide ion (OH—).

The humidity of the air steam may be as high as 75-98% and temperature of the air stream may be as low as 70° F. (20° C.). The air stream can be mixed with additional air to reduce the humidity of the air stream to around 50 to 75% to capture more carbon dioxide gas from the air stream and reduce tendencies of condensation in the carbon capture media (i.e.) sorbent column.

In some embodiments, the humidity/temperature adjusting unit 106 draws additional air from at least one of surroundings (ambient air), ventilation systems, or any dedicated air supply devices.

The humidity-reduced air stream may have 400 parts per million (ppm) $CO_2$ if the source air is ambient. If it is a point source such as flue gas, the air may have several folds higher $CO_2$ concentration such as 10-25 volume %. The $CO_2$ adsorbing unit 110 is connected with the humidity/temperature reduction unit 106 and receive the humidity-adjusted air stream from the humidity/temperature reduction unit 106. The $CO_2$ capturing unit 110 includes a sorbent column to separate the $CO_2$ from other molecules. In some embodiments, the sorbent column is made of polyamine-Cu (II) complex resin. In some embodiments, the polyamine-Cu (II) complex resin is Polyam-N-Cu2+ resin. The Polyam-N-Cu2+ resin may have large $CO_2$ capture capacity. For example, 1 kg of polyam-N-Cu2+) can be able to capture 225 grams of $CO_2$.

The $CO_2$ adsorbing unit 110 allows the humidity-adjusted air stream to pass through the sorbent column. The polyamine-Cu (II) complex resin (or the sorbent column) acts as a sorbent and selectively adsorbs the $CO_2$ from the humidity-adjusted air stream, while allowing the non-$CO_2$ components to pass through. In some embodiments, the humidity and temperature adjusted air stream is passed through the sorbent column in an up-flow mode or a down-flow mode. The down-flow mode may be useful for compaction of the bed.

In some embodiments, the sorbent column is conditioned using at least one of spent alkali with a pH in a range of 11-13 or fresh batch of 0.5% weight by weight (w/w) of NaOH before allowing the humidity-adjusted air to pass through. The conditioning of the sorbent column facilitates 90% removal efficiency of the $CO_2$ from the humidity-adjusted air stream.

The sorbent column may capture over 20% of its own weight of $CO_2$. When the sorbent column becomes saturated with the captured $CO_2$, a regeneration is required for the sorbent column to restore its $CO_2$ adsorption capacity. In some embodiments, the sorbent column is regenerated by passing a source of NaCl to the sorbent column, followed by passing an alkaline stream to the sorbent column.

In some embodiments, around 60-bed volumes of the source of NaCl is passed through the sorbent column. The term "bed volume" refers to the volume of the sorbent material or resin within the column. When the source of NaCl flows through the sorbent column, and comes into contact with the sorbent material/resin, the captured $CO_2$ is displaced. The source of NaCl comprises at least one of sea water or spent brine or fresh brine. A concentration of the source of NaCl required for the regeneration is 3 or more % weight by weight. The brine may be collected from an industry, a chloro-alkali plant or an oil field; or may be prepared fresh at the required concentration.

In some embodiments, 20 bed volumes of the alkaline stream in a down-flow mode is passed through the sorbent column. The alkaline stream includes NaOH solution or lime regenerant. The alkaline stream is used as part of the regeneration process to further cleanse the sorbent column and remove any remaining traces of the captured $CO_2$. Both NaCl and the alkaline stream help to regenerate the sorbent column and make it available for reuse or further treatment. Further, passing the alkaline stream in a down-flow mode ensures efficient contact between the alkaline stream and the sorbent column for effective regeneration. After regeneration, the sorbent column can be used for next cycle.

In some embodiments, the sorbent column is regenerated by exposing the sorbent column to hot water, steam or any waste heat source to release the captured $CO_2$ as a gas. The hot water may be used in temperature of 80° C.

In some embodiments, the sorbent column is regenerated by at least one of (i) NaCl, NaOH, or heat/hot water.

With the regeneration, pure $CO_2$ is separated from the sorbent column. The pure $CO_2$ gas may be captured and stored in a carbon dioxide storage unit. When NaCl and alkali are used for regeneration, the storage unit holds $CO_2$ in the form of a bicarbonate species in spent brine. When hot water is used for regeneration, the $CO_2$ storage unit stores $CO_2$ in the form of a pure gas. The carbon dioxide storage unit may include isolated gas containers. The system 100 can be deployed as a modular system in versatile environment that may include an open environment comprising a cattle breeding environment, a house hold setting or an industrial environment.

Figure 2:
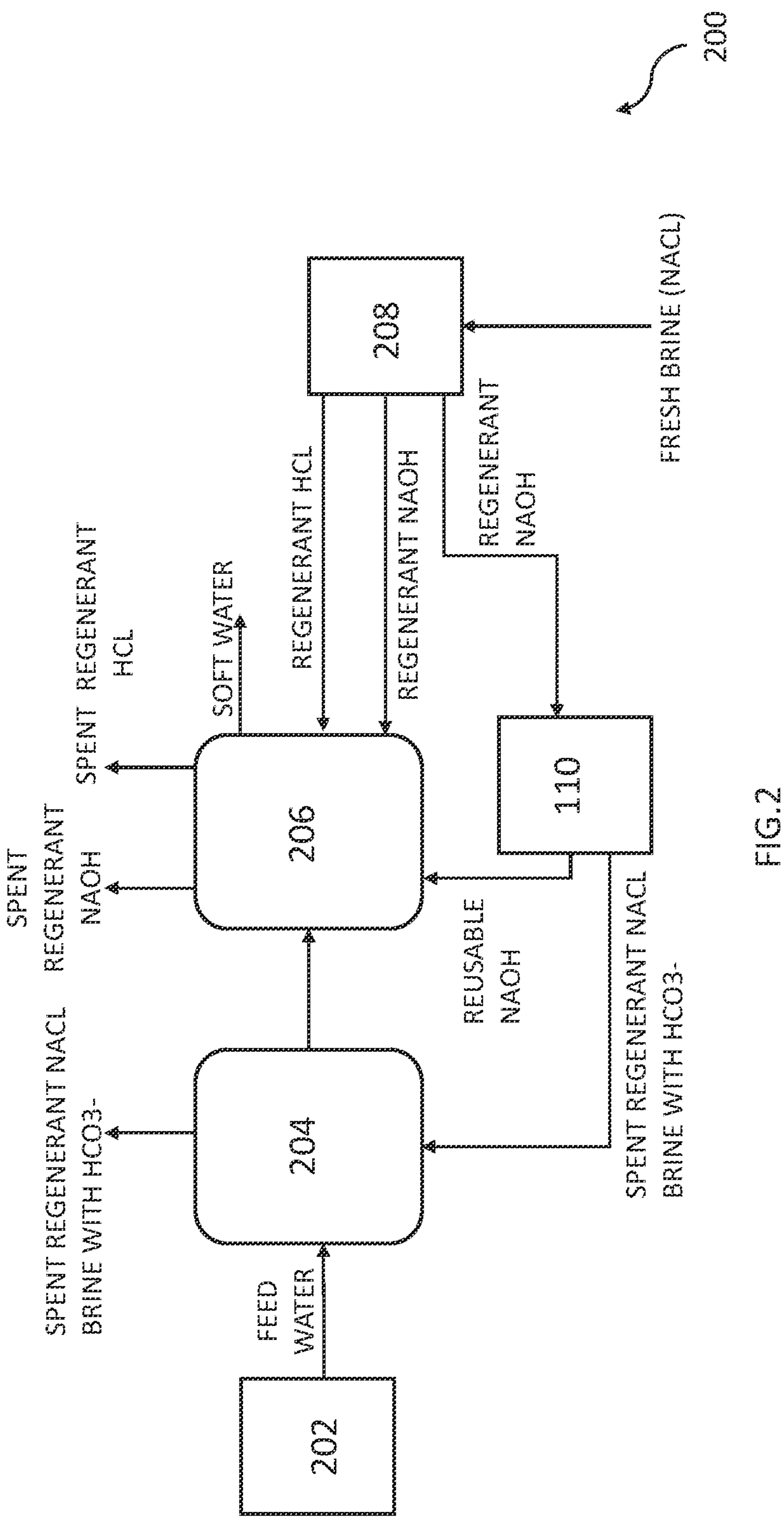
FIG. 2 illustrates a system for regenerating resins of a water softening unit using the spent NaCl brine comprising bi-carbonate from the $CO_2$ adsorbing unit of FIG. 1 according to various embodiments of the present invention.

FIG. 2 illustrates a system for regenerating resins of a water softening unit using the spent NaCl brine comprising bi-carbonate from the $CO_2$ adsorbing unit of FIG. 1 according to various embodiments of the present invention. The system 200 includes a waste water feed unit 202, a Strong Acid Cation (SAC) resin unit 204, a Weak Acid Cation (WAC) resin unit 206, a bipolar Electrodialysis reversal (EDR) unit 208, the $CO_2$ adsorbing unit 110.

A boiler feed water or oilfield produced water is sent from the waste water feed unit 202 into the Strong Acid Cation (SAC) resin unit 204 and the Weak Acid Cation (WAC) resin unit 206 that functions as a primary resin and a polishing resin respectively to remove hardness causing ions from the waste water producing softened water for steam production. When the resins run out of capacity, they need to be regenerated.

The Strong Acid Cation (SAC) resin unit 204 is regenerated using the spent NaCl brine comprising bi-carbonate from the $CO_2$ adsorbing unit 110. The Weak Acid Cation (WAC) resin unit 206 is regenerated using HCl and NaOH produced from the bipolar Electrodialysis reversal (EDR) unit 208. The bipolar Electrodialysis reversal (EDR) unit 208 produces regenerant hydrochloric acid and regenerant sodium hydroxide from fresh brine (NaCl) through electrodialysis. The Weak Acid Cation (WAC) resin unit 206 is regenerated using 4 to 6 weight % of regenerant hydrochloric acid and 4 to 6 weight % of regenerant sodium hydroxide produced by the bipolar Electrodialysis reversal (EDR) unit 208. Optionally, 0.5 weight % of regenerant sodium hydroxide from the bipolar Electrodialysis reversal (EDR) unit 208 is introduced into the $CO_2$ adsorbing unit 110 for conditioning the sorbent column. Surplus regenerant hydrochloric acid from the bipolar Electrodialysis reversal (EDR) unit 208 can be utilized for acid cleaning in multiple operations or producing hydrogen by interacting with metals such as aluminum from waste aluminum cans.

The resulting spent brine from the water softening unit can be disposed in low pressure disposal wells without the need for high pressure geological formations under super-critical $CO_2$ pressures (nearly 100 atmospheres). Resulting salt such as aluminum chloride from these reactions can be used as coagulants in water treatment industry. The bipolar Electro-dialysis reversal (EDR) unit 208 is powered with renewable electricity to create a green process.

Figure 3A:
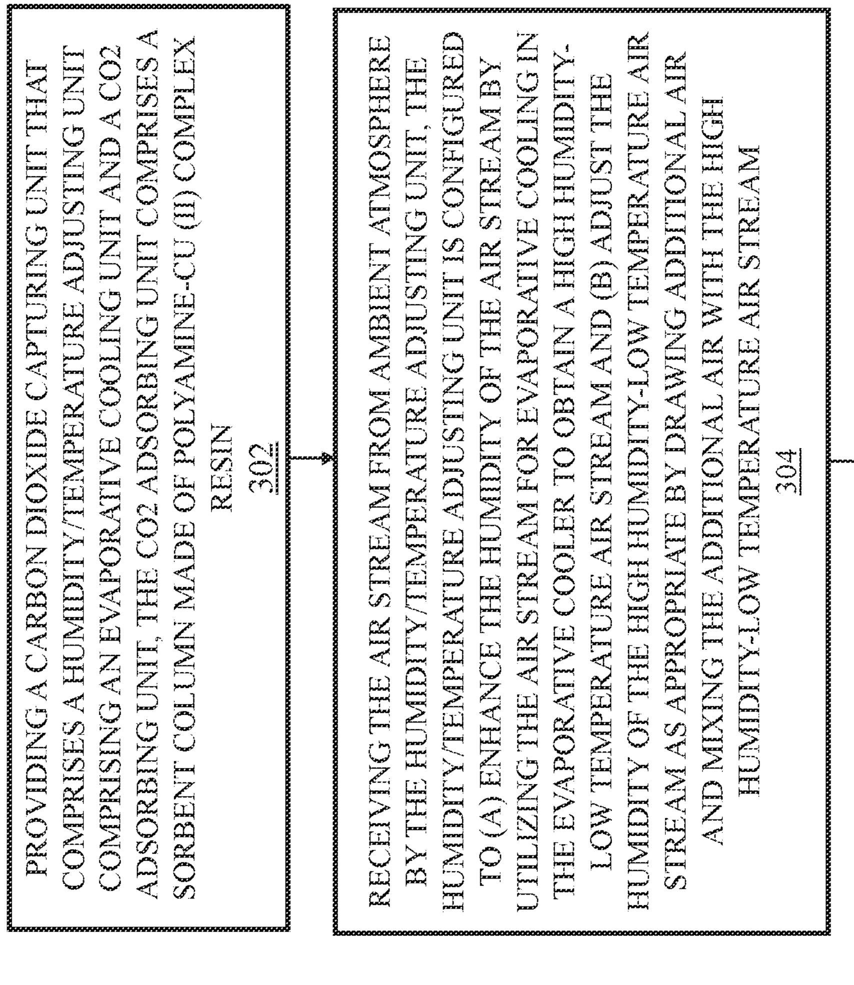
FIGS. 3A-3B are flow diagrams that illustrate a method of capturing carbon dioxide from a humidity-adjusted air stream according to various embodiments of the present invention.
Figure 3B:
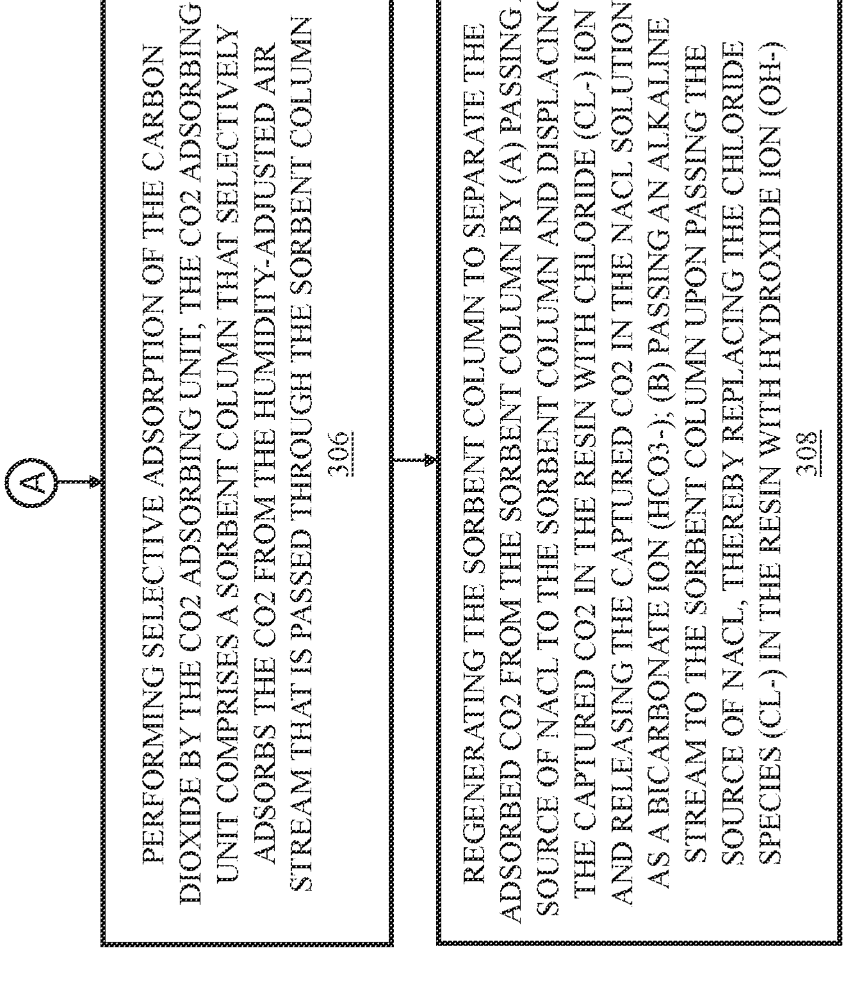

FIGS. 3A-3B are flow diagrams that illustrate a method of capturing carbon dioxide from a humidity-adjusted air stream according to various embodiments of the present invention.

At step 302, the method includes providing a carbon dioxide capturing unit that comprises a humidity/temperature adjusting unit comprising an evaporative cooling unit and a $CO_2$ adsorbing unit. The $CO_2$ adsorbing unit comprises a sorbent column made of polyamine-Cu (II) complex resin.

At step 304, the method includes receiving the air stream from ambient atmosphere by the humidity/temperature adjusting unit. The humidity/temperature adjusting unit is configured to (a) enhance the humidity of the air stream by utilizing the air stream for evaporative cooling in the evaporative cooling unit to obtain a high humidity-low temperature air stream and (b) adjust the humidity of the high humidity-low temperature air stream as appropriate by drawing additional air and mixing the additional air with the high humidity-low temperature air stream.

At step 306, the method includes performing selective adsorption of the carbon dioxide by the $CO_2$ adsorbing unit. The $CO_2$ adsorbing unit comprises a sorbent column that selectively adsorbs the $CO_2$ from the humidity-adjusted air stream that is passed through the sorbent column.

At step 308, the method includes regenerating the sorbent column to separate the adsorbed $CO_2$ from the sorbent column by (a) passing a source of NaCl to the sorbent column, and displacing the captured $CO_2$ in the resin with chloride (Cl—) ion and releasing the captured $CO_2$ in the NaCl solution as a bicarbonate ion (HCO3-); (b) passing an alkaline stream to the sorbent column upon passing the source of NaCl, thereby replacing the chloride species (Cl—) in the resin with hydroxide ion (OH—).

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

What is claimed is:

1. A system for capturing carbon dioxide from a humid-adjusted air stream, wherein the system comprising: a carbon dioxide capturing unit comprising a humidity/temperature adjusting unit that comprises an evaporative cooling unit and a CO2 adsorbing unit, wherein the carbon dioxide adsorbing unit comprises a sorbent column made of polyamine-Cu (II) complex resin, wherein the humidity/temperature adjusting unit is configured to (a) enhance the humidity of the air stream by utilizing the air stream for evaporative cooling in the evaporative cooling unit to obtain a high humidity-low temperature air stream and (b) adjust the humidity of the high humidity-low temperature air stream as appropriate by drawing additional air and mixing the additional air with the high humidity-low temperature air stream, wherein the air stream comprises a humidity of about 75 to 95% and the humidity-adjusted air stream comprises a humidity of about 50 to 75%, wherein the CO2 adsorbing unit is configured to receive the humidity-adjusted air stream from the humidity/temperature adjusting unit and allow the humidity-adjusted air stream to pass through the sorbent column to selectively adsorb the CO2 from the humidity-adjusted air stream, thereby capturing the CO2 from the humidity-adjusted air stream, wherein the sorbent column is regenerated to separate the adsorbed CO2 from the sorbent column by (a) passing a source of NaCl to the sorbent column and displacing the captured CO2 in the resin with chloride (cl—) ion and releasing the captured CO2 in the NaCl solution as a bicarbonate ion (HCO3-); and (b) passing an alkaline stream to the sorbent column upon passing the source of NaCl, thereby replacing the chloride species (Cl—) in the resin with hydroxide ion (OH—); wherein the polyamine-Cu (II) complex resin is Polyam-N-Cu2+ resin; wherein the sorbent column is regenerated using NaOH produced through electro-dialysis of NaCl in a bipolar Electro-dialysis reversal (EDR) unit; and wherein the spent NaCl solution comprising adsorbed CO2 as a bicarbonate ion (HCO3-) is used to regenerating resins of a water softening unit comprising a Strong Acid Cation (SAC) resin unit and a Weak Acid Cation (WAC) resin unit.

2. The system of claim 1, wherein the evaporative cooling unit is a Peltier hybrid cooling system.

3. The system of claim 1, wherein the sorbent column is conditioned using spent alkali with a pH in a range of 11-13 or fresh batch of 0.5% weight by weight (w/w) of NaOH before allowing the humidity-adjusted air stream to pass through.

4. The system of claim 1, wherein the source of NaCl comprises at least one of sea water, spent brine or fresh brine, wherein the alkaline stream comprises at least one of NaOH solution or lime regenerant.

5. The system of claim 4, wherein around 60-bed volumes of the source of NaCl and 20 bed volumes of the alkaline stream are passed through the sorbent column in a down-flow mode.

6. The system of claim 1, wherein the sorbent column is regenerated by exposing the sorbent column to hot water at a temperature of 80° C. or any waste heat source to produce pure CO2 gas.

7. The system of claim 1, wherein the evaporative cooling unit is an empty box, a vegetable cooler, a gymnasium which has been air cooled in arid environment or a pigsty cooler for animals in arid and hot environment.

8. The system of claim 1, wherein the CO2 adsorbing unit are provided as modular cartridges.

9. A method for capturing carbon dioxide from a humidity-adjusted air stream, wherein the method comprises the steps of: providing the carbon dioxide capturing unit as recited in claim 1; receiving the air stream from ambient atmosphere by the humidity/temperature adjusting unit, wherein the humidity/temperature adjusting unit is configured to (a) enhance the humidity of the air stream by utilizing the air stream for evaporative cooling in the evaporative cooling unit to obtain the high humidity-low temperature air stream and (b) adjust the humidity of the high humidity-low temperature air stream as appropriate by drawing additional air and mixing the additional air with the high humidity-low temperature air stream; performing selective adsorption of the carbon dioxide by the CO2 adsorbing unit, wherein the CO2 adsorbing unit comprises the sorbent column that selectively adsorbs the CO2 from the humidity-adjusted air stream that is passed through the sorbent column; and regenerating the sorbent column to separate the adsorbed CO2 from the sorbent column by (a) passing the source of NaCl to the sorbent column, and displacing the captured CO2 in the resin with chloride (Cl—) ion and releasing the captured CO2 in the NaCl solution as the bicarbonate ion (HCO3-); and (b) passing the alkaline stream to the sorbent column upon passing the source of NaCl, thereby replacing the chloride species (Cl—) in the resin with hydroxide ion (OH—).

10. The method of claim 9, wherein the method comprising conditioning the sorbent column using spent alkali with a pH in a range of 11-13 or fresh batch of 0.5% weight by weight (w/w) of NaOH before allowing the humidity-adjusted air to pass through.

11. The method of claim 9, wherein the method comprising regenerating the sorbent column by (i) passing around 60-bed volumes of a source of NaCl to the sorbent column and displacing the captured $CO_2$ in the resin with chloride (Cl—) ion and releasing the captured $CO_2$ in the NaCl solution as the bicarbonate ion (HCO3-); and (ii) passing around 20 bed volumes of the alkaline stream to the sorbent column in a down-flow mode, upon passing the source of NaCl, thereby replacing the chloride species (Cl—) in the resin with hydroxide ion (OH—).

12. The method of claim 9, wherein the method comprises regenerating resins of a water softening unit comprising a Strong Acid Cation (SAC) resin unit with primary resins and a Weak Acid Cation (WAC) resin unit with polishing resins, wherein the method comprises introducing the spent NaCl solution comprising $CO_2$ bicarbonate ion (HCO3-) from the $CO_2$ adsorbing unit into the Strong Acid Cation (SAC) resin unit of the water softening unit to regenerate the Strong Acid Cation (SAC) resin unit.

13. The method of claim 12, wherein the method comprises regenerating the Weak Acid Cation (WAC) resin unit of the water softening unit using NaOH and HCl produced from NaCl by performing electrodialysis in the bipolar Electrodialysis reversal (EDR) unit.

14. The method of claim 13, wherein the method comprises regenerating the sorbent column of the $CO_2$ adsorbing unit simultaneously using the NaOH produced from the bipolar Electrodialysis reversal (EDR) unit.

* * * * *